Figure 5:
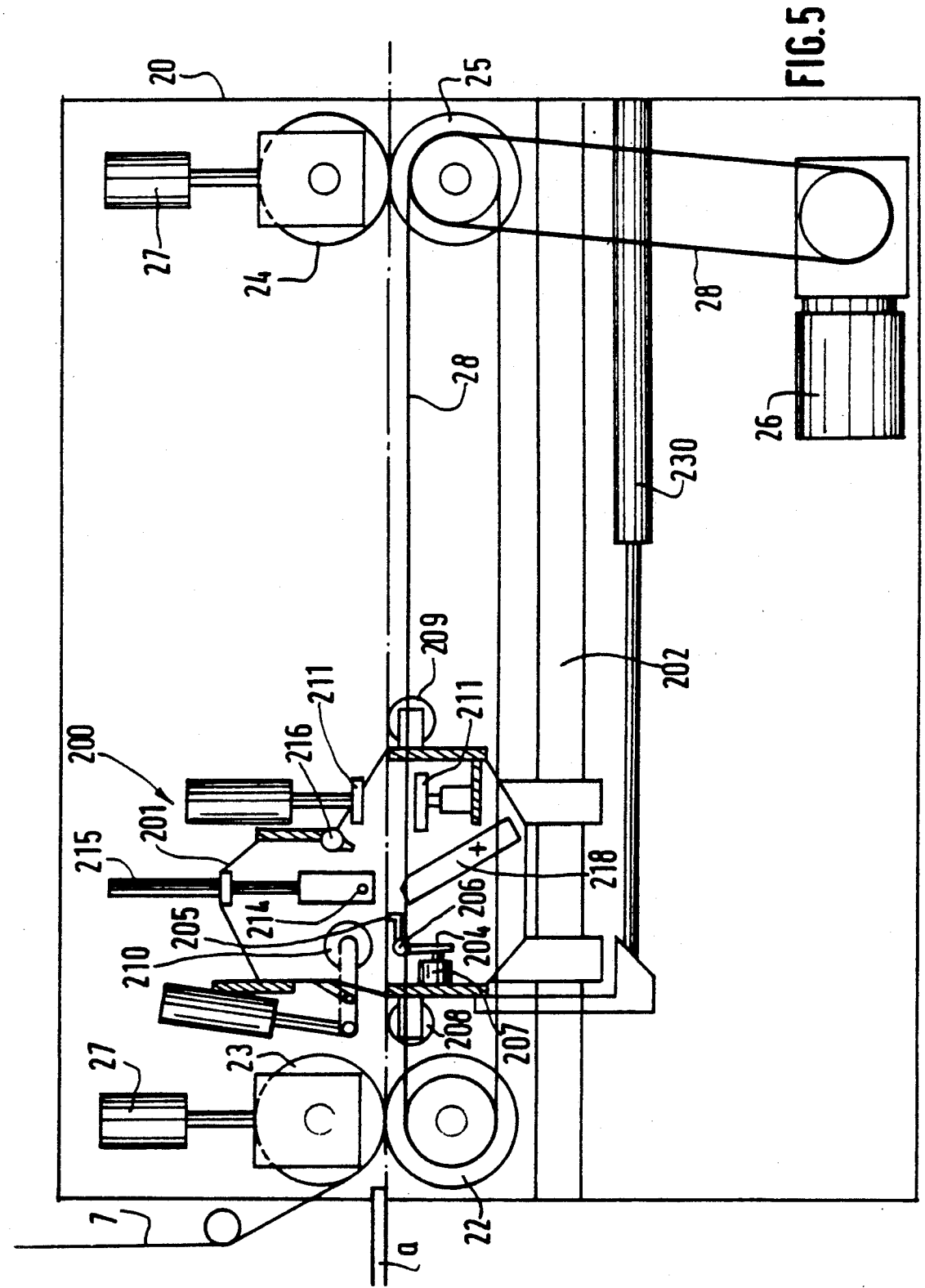

United States Patent [19]

Ruemeli et al.

[11] Patent Number: 5,069,738
[45] Date of Patent: Dec. 3, 1991

[54] PROCESS AND DEVICE FOR APPLYING A PROTECTIVE FILM TO AN ALVEOLATED BOARD

[75] Inventors: Robert Ruemeli, Andolsheim; Gérard Heitzler, Muntzenheim, both of France

[73] Assignee: Kaysersberg Packaging, S.A., Kaysersberg, France

[21] Appl. No.: 464,599

[22] Filed: Jan. 12, 1990

Related U.S. Application Data

[63] Continuation of Ser. No. 203,094, Jun. 7, 1988, abandoned.

[30] Foreign Application Priority Data

Jun. 23, 1987 [FR] France .................. 87 08793

[51] Int. Cl.$^5$ ............................................. B32B 31/10
[52] U.S. Cl. ..................... 156/444; 156/216; 156/468; 156/479; 156/522
[58] Field of Search ............... 156/216, 479, 522, 204, 156/226, 468, 270, 444; 493/450, 418, 408

[56] References Cited

U.S. PATENT DOCUMENTS

| | | | |
|---|---|---|---|
| 870,619 | 11/1907 | Fidell | 156/444 |
| 3,310,855 | 3/1967 | Orioli | 425/383 |
| 3,338,773 | 8/1967 | Schneider | 156/444 |
| 3,383,262 | 5/1968 | Ettore et al. | 156/479 X |
| 3,616,077 | 10/1971 | Jessee | 156/479 |
| 4,680,079 | 7/1987 | Tanaka | 156/552 |
| 4,764,240 | 8/1988 | Simeone, Sr. et al. | 156/522 X |

Primary Examiner—Michael W. Ball
Assistant Examiner—Michele K. Yoder
Attorney, Agent, or Firm—Breiner & Breiner

[57] ABSTRACT

Device for applying a protective film to a board consisting of two flat cover panels (2 and 3), coupled by partitions (4) integral with the panels, forming longitudinal cavities (5) comprising means for depositing a film of flexible material (7) on a first surface according to the longest dimensions of the board, so as to form a fold (71) at least over one of the ends onto which the cavities (5) open so as to cover the cavities with the fold.

5 Claims, 4 Drawing Sheets

U.S. Patent   Dec. 3, 1991   Sheet 1 of 4   5,069,738
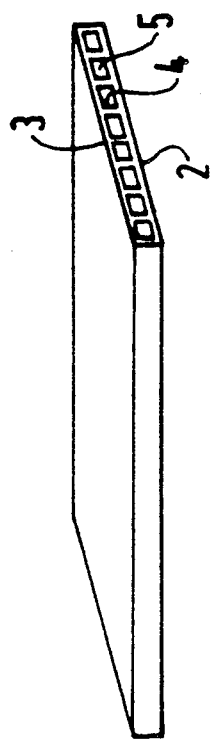
FIG.1
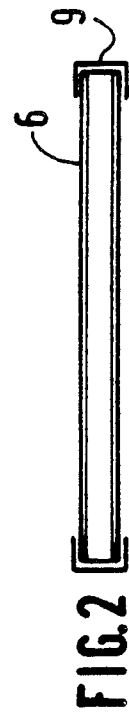
FIG.2
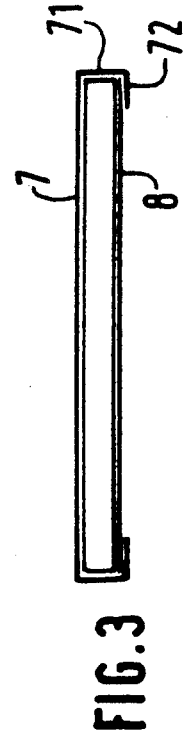
FIG.3
FIG.4
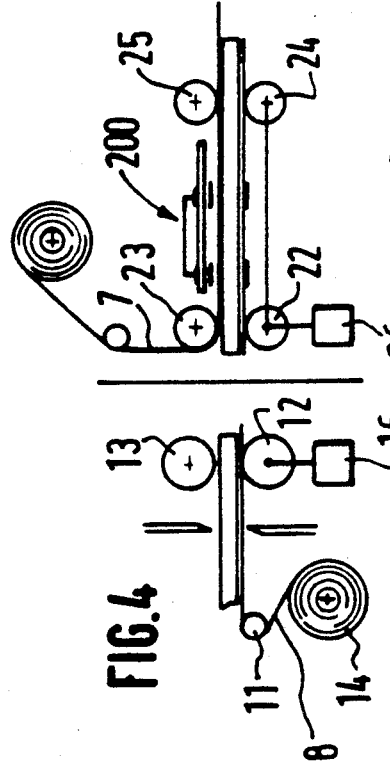
FIG.4A
FIG.4B
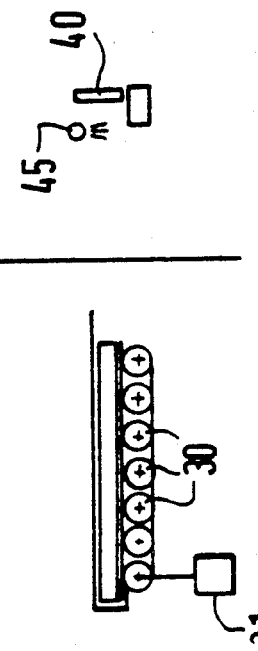
FIG.4C
FIG.4D

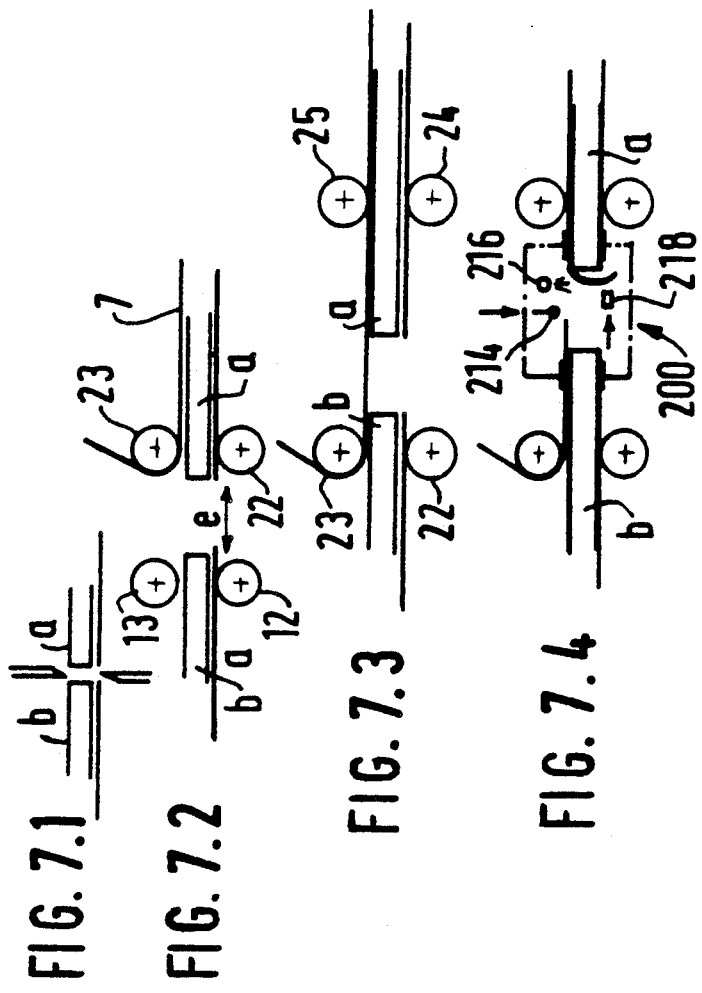

PROCESS AND DEVICE FOR APPLYING A PROTECTIVE FILM TO AN ALVEOLATED BOARD

This is a continuation of application Ser. No. 07/203,094 filled June 7, 1988 now abandoned.

The invention concerns boards said to be alveolated, i.e. the boards consist of two flat, spaced panels, coupled to each other by partitions integral with the panels: the partitions are arranged at regular intervals so as to form cavities or recesses. The invention concerns a process, together with a process implementation device, enabling a protective film to be applied to the sides onto which the cavities open, so as to isolate the said cavities from any penetration or deposit of unwanted material, during the period between the manufacture of the boards and their use.

An alveolar structured board is produced by extruding a thermoplastic material through a flat die, appropriately configured so as to produce two spaced boards, coupled by partitions. Shaping and cooling of the material are provided by a calibration device at the outlet side of the die. At the outlet from the extrusion line, the continuous band is cut into panels or boards, by means of a saw or shears, which cuts the band across its direction of movement.

The panels obtained have numerous applications, and in particular, can be used as construction elements to form partitions or roofing surfaces of buildings or others. In such cases, a rigid translucent material is preferably used, such as polycarbonate.

Usually, the extrusion line is equipped with a system for laying a protective film on both surfaces of the board. In most cases, the film is in flexible plastic, such as polyethylene, the object of which is temporarily to protect the surface from scoring and impacts liable to occur during the various handling operations to which the product is subjected before it is finally used. Also, to prevent dirt, dust or condensation water lodging inside the cavities during this period, and up to now, the cavities have been protected by adhesive tape applied manually to the board at the end of the manufacturing process, at the outlet from the extrusion line.

In accordance with the invention, this restricting delicate operation is dispensed with by blanking off the cavities using the film with which the surface of the boards is covered.

The process consists in:
driving the boards, in a flat movement of translation,
separating two successive boards by a distance at least equal to their thickness,
depositing a film of flexible material on one of the covering panels of the first board, then of the second board,
cutting the film in the gap made between the boards, so as to obtain at least one free part forming a fold on one board,
applying the fold thus formed to the side of the board so as to cover the cavities,
lastly, affixing the fold to the board.

By separating the two boards by a sufficient distance, and appropriately cutting the film in the space thus obtained, two folds are obtained which can be used to cover the cavities of the opposite ends of the board.

This arrangement offers the advantage of being able to automate closing off of the recesses, leading to a saving in labor and material. Moreover, if the operation is performed immediately after laying of the protective film, the time during which the recesses are open to the air and during which they can become dirty, is reduced.

The invention will be better understood and other features will appear on reading the description which follows, of a non-limitative method for the production of a device to implement the process, and illustrated in the appended drawings, of which:

FIG. 1 represents an alveolated board.

FIG. 2 schematically represents the method of enveloping the board according to the former method.

FIG. 3 schematically represents the board enveloping method complying with the invention.

FIG. 4 schematically represents the various sections of the process implementation device.

FIG. 5 gives details of the second section of the device shown in FIG. 4.

Figure 6:
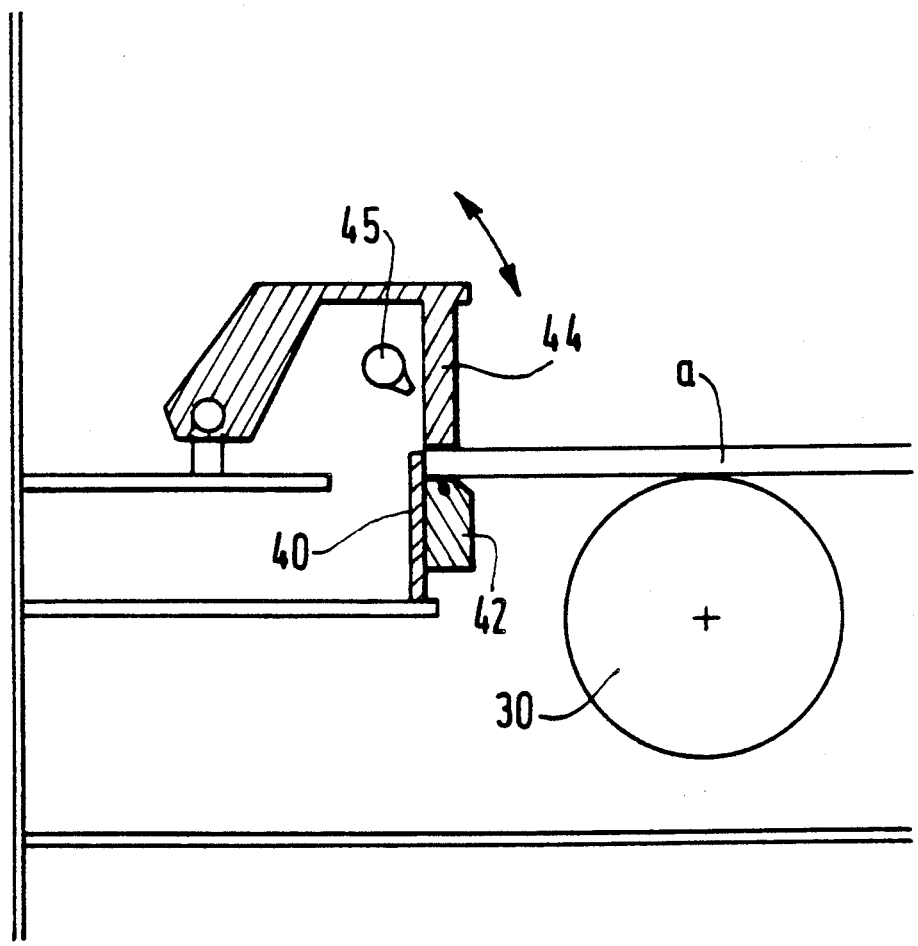

FIG. 6 gives details of the fourth section of the device shown in FIG. 4.

FIG. 7 illustrates the various steps of the process.

FIG. 1 shows a board of the type in question. It consists of two flat covering panels 2 and 3, coupled by regularly spaced partitions 4, so as to form longitudinal cavities 5. Depending on thickness and the application, it is possible to provide an intermediate supplementary panel to consolidate the structure.

In products obtained using the former method, the boards leaving the extrusion line are protected, FIG. 2, by a flexible plastic film 6. The ends are also covered with adhesive tape 9 blanking off the longitudinal cavities. This tape is applied manually.

In accordance with the invention, FIG. 3, a film 7 in flexible material is applied to one of the surfaces along the longest dimensions of the board, whose length is sufficient to form at least one fold 71 covering one of the ends. The fold can be provided with a tab 72 enabling it to be coupled to film 8 covering the other surface of the board.

The tab can be affixed by any method, gluing or welding.

FIG. 4 schematically represents the various sections of the device by which the folds are shaped and applied.

The first section, A, located immediately at the outlet from the extrusion line, which has not been shown, features an element cutting the board leaving the extrusion line in the form of a continuous band. Each board is cut to the desired length. The cutting element, depending on the thickness or rigidity of the material, can be a simple shears or a rotary saw mounted on a carriage moving transversally with respect to the direction of movement of the board. Any other appropriate method can be used. It will be noted that, due to the extrusion process, the cavities are oriented along the direction of movement.

A pair of superimposed cylinders 12, 13, driven by a motor 16, convey the panel or board which has just been cut.

Generally, in installations using the former method, rolls of flexible material film, for example polyethylene, are located on either side of the board, at the inlet side of the cutting element, and applicator rollers deposit the film on each of the two surfaces.

In the process of the invention, bottom roller 11, which transfers film 8 from its feed roll, is conserved.

The second section, B, is placed after the first; inside a frame, not shown, this section consists of two pairs of drive rollers 22, 23 and 24, 25, separated from each other.

These rollers are synchronized and driven at controlled speed by motor 26. The top rollers 23, 25 are mounted on vertically mobile supports, and drawn downwards by jacks, which are not shown on this diagram, to enable adjustment of the interval between the rollers as a function of the thickness of the boards to be driven.

The first top roller 23, at the entry to section B, is used as an idler roller for a film of flexible material, which is preferably the same as above, and which is fed from a roll.

A carriage, 200, capable of moving parallel to the translation plane of the boards between the pair of inlet rollers and the outlet pair, is mounted on the frame of section B. This carriage, 200, is equipped with various facilities ensuring closing of the cavities opening onto the up-system end of the boards, which pass through section B. The carriage is described in detail further on, in conjunction with FIG. 5.

Section C, down-system from the previous, is equipped with conveyor rollers 30 driven by motor 31. At the end of this transfer section, the last section of the device, section D, is fitted with a stop device 40 and facilities for closing the cavities opening onto the down-system edge of the boards. A description of these is given below in relation with FIG. 6.

By referring to FIG. 5, the first pair of superimposed rollers 22, 23 can be seen inside frame 20, the top roller of which, 23, is capable of vertical movement, and bears against the board passing in the interval, due to the effect of jacks 27. At the other end of frame 20, the second pair of rollers 24 and 25, identical to the first, can be seen. A system of belts 28, controlled by motor 26 synchronously drives the rollers.

Carriage 200 is mounted in the interval provided between the rollers. The carriage features a chassis 201, equipped with support bearings sliding along rails 202 coupled to the frame and parallel to the direction of movement of the boards.

The carriage is fitted with two rows of rollers 208 and 209 arranged crosswise on either side of the chassis; these rollers behave as supports to the boards crossing them.

A claw 204, in the form of an angle bracket, pivots on the carriage around transverse shaft 206; one end of this is fitted with a pawl forming stop 205, which can insert itself in the passage of the boards, when the claw is in the active or high position, and retracts, liberating the passage, in the low position. Both positions are controlled by jack 207, coupled to a return spring, actuating the bottom arm of claw 204.

Two presser rollers, 210, controlled by jacks, cooperate with the claw and guarantee that the board does not slip over the stop when the latter is in the active position. Pincers 211, consisting of transverse bars, superimposed on either side of the passage and controlled by jacks, can take up a retracted position, as shown on the figure, and an active position in which they clamp the board in the passage, immobilizing it with respect to the carriage.

Between the two gripping or blocking systems, formed by claw 204 and pincers 211, is a heating wire 214, which extends across the carriage; the wire is stretched between two vertically mobile arms due to the action of jacks 215.

A ramp of air blowing nozzles 216 is located down-system, parallel to the heating wire. The nozzles are supplied through a common manifold and are downward pointing.

A transverse bar 218 is fitted between two levers pivoting under the translation chain of the boards. The levers are controlled by jacks to provide two positions: the first position, retracted, as shown in the figure, in which the bar 218 is separated from the plane, and a second position, in which the levers are vertical, and in which the bar is flush with this plane.

Bar 218 features a heating element along its length, capable of forming a weld.

A jack 230, coupled with frame 20, is used to bring the carriage from the down-system position up to its cycle start position, up-system.

FIG. 6 shows the recess closing station for the second end of the boards. Conversely to the first, this is a fixed station and is located immediately after section C and its conveying system 30.

A stop, 40, is located across the path of the boards driven by system 30. A transverse bar 42, fitted with a heating element for welding, is slightly offset with respect to stop 40. Bar 42 is flush with the board translation plane.

A spacer ring 44 pivot around a transverse shaft, and is controlled by jacks to give two positions: a first raised position, and a second position, as shown on the figure, in which it places itself in the same vertical plane as bar 42. The space between the bar and the spacer ring corresponds to the thickness of the boards.

A row of nozzles 45, located near the spacer rings, blows jets of air towards the board in the opposite direction to its direction of movement.

In an option, the stop can tilt to allow the boards to pass, if required.

For the description of the device which follows, it is also possible to refer to FIG. 7 showing the process procedure for two successive boards a and b.

Fully up-system, the cutting element cuts the boards one after the other: a, b, etc. from the continuous band leaving the extrusion line, FIG. 7.1. The boards receive a protective film 8 on the bottom surface, before being cut. In this section, board a, which was detached from the band, moves at the same speed as the latter. The separation between their edges is then small.

The boards then pass into the next section.

A separation e of a determined value is created between the boards, this is at least equal to board thickness, by accelerating board a which is in the framework of section B for a short instant, before board b enters the frame in turn, FIG. 7.2. This can be obtained very simply by means of a board position sensor, for example a photoelectric cell, which will act on the control of section roller drive motor 26.

The covering film 7 is applied continuously to the top surface of the boards, at their entry into the section, by head roller 23. In the situation shown in FIG. 7.2, the carriage is still in the down-system position at which the previous cycle ended. It is taken back to the starting position, at the latest, at the moment in which board b comes into contact with rollers 22, 23, FIG. 7.3.

Board b then passes into the carriage, and its down-system end bears against stop element 205 of claw 204, which has been raised in the meantime. Presser rollers 210 have been set to the down position and apply sufficient pressure to the board to prevent it slipping.

Pincers 211, controlled by an appropriate detection device, close onto board a at the same time. The carriage and boards a and b then form a coupled assembly, driven in unison by the two pairs of rollers of the section.

The various operations leading to closing of the up-system end of board a, are performed automatically during this transfer step. Heating wire 201, which is located more or less in the middle of space e, covered by film 7, is moved downwards and cuts the film into two free part 71, forming folds. The air blown in through ramp 216 then pushes the film against the up-system edge of board a. Bar 218 is then raised, and takes up position under the edge of the panel, and in passing picks up the end of the film which is pushed against the bottom surface, and solders it to the protective film on the bottom surface, by actuating its heater element. The jack pressure is slightly increased to actuate top pincer 211 to improve the contact between both films, and thus ensure that the welding operation takes place under adequate conditions. This sequence of operations is illustrated in FIG. 74.

At the end of this step, the carriage has arrived at end of travel. The panel is uncoupled from the carriage by disengaging the claw, the presser roller and the pincers. The heating wire is raised and the bottom bar pulled back.

Board a, thus freed passes to the next section while the carriage is drawn back to its starting position by jack 230 for a new cycle, which leads to closing off of the next board, b.

Conveying system 30 provides rapid movement of the board, so as to increase the separation between it and the next board, and leave it sufficient time for the various operations which follow to be performed.

At end of travel, board a stops against stop 40. Beforehand, FIG. 7.5, a detection device, not shown, has started blowing air through nozzle ramp 45 to bring the floating part of the film against the downsystem edge of the board. The board then slips on bar 42 at contact with which the end of the film has been brought against its bottom surface. When the board stops against element 40, the heating element is energized and spacer ring 44 is pushed back against the board, to apply the pressure required to obtain a weld of adequate quality. When the operation is completed, bar 44 is raised and the board evacuated to a palletization system by means of appropriate prehension facilities.

Facilities can be provided, so that, in the event of difficulties on the production line, stop 40 can be retracted, enabling evacuation of the board beyond the fixed station, so as to prevent jamming.

The device which has just been described is simply an illustration of a method of realising the invention. Variations can be envisaged, without, however, leaving the framework of the invention.

Thus, for example, the carriage can be equipped with a supplementary closing system to blank off the opposite edges of two successive boards simultaneously. The fixed station would then no longer be required. However, the method which was described in detail above is preferable insofar as there is no risk of disturbing the extrusion process.

We claim:

1. Device for applying a protective film to alveolar structured boards with two flat spaced panels coupled by partitions integral therewith and making longitudinal cavities comprising:
   - means for driving the said boards in line in a flat translation movement, two successive boards (a and b) being separated by a distance e which is at least equal to their thickness;
   - means for depositing a film of flexible material on one flat panel of the first board (a), then on the second board (b) in such a manner that said film extends over said distance e;
   - means for transversely cutting said film present over said distance e provided between boards (a and b) so as to obtain at least one free part of said film;
   - means for folding said at least one free part onto a side of one of the boards so as to cover the cavities, said means comprising air blowing nozzles;
   - means for sealing said at least one free part folded onto said side to the board; said means for cutting said film, said means for folding and said means for sealing being mounted on a carriage means moving with said boards and being temporarily rigidly coupled to said boards during said cutting of said film, folding and sealing of said at least one free part of said film to one of said boards.

2. Device according to claim 1 wherein said carriage means includes a device to fold the end of said at least one free part against the second flat panel of the said board on which said film is deposited.

3. Device according to claim 1 including additional means enabling the distance separating two successive boards to be adjusted.

4. Device according to claim 3 wherein said additional means consists of two board drive devices located one after the other which are separately controlled.

5. Device according to claim 1 further comprising a fixed station which includes a stop, a means for folding a second free part of said film formed in said cutting of said film, and means for fixing said second free part of the board too which said film is attached.

* * * * *